United States Patent [19]

Nikitin et al.

[11] Patent Number: 4,477,690

[45] Date of Patent: Oct. 16, 1984

[54] COUPLING UNIT OF TWO MULTILAYER CABLES OF HIGH-VOLTAGE GENERATOR STATOR WINDING

[76] Inventors: Pavel Z. Nikitin, ulitsa Stroitelei, 5, korpus 1, kv. 2, Moscow; Yanush B. Danilevich, ulitsa Tipanova, 29, kv. 681, Leningrad; Konstantin N. Maslennikov, ulitsa Petukhova, 138, kv. 87, Novosibirsk; Pavel S. Kabanov, ulitsa Sevanskaya, 19, korpus 1, kv. 22, Moscow; Konstantin F. Potekhin, ulitsa Stanislavskogo, 11, kv. 186, Novosibirsk; Lev A. Zolotov, bulvar Yana Rainisa, 9, kv. 55, Moscow; Alexandr I. Nikolsky, ulitsa Dubninskaya, 14, korpus 2, kv. 59, Moscow; Tibor M. Nemeni, ulitsa Khalturinskaya, 11, kv. 245, Moscow; Veniamin S. Turutin, ulitsa Perovskaya, 8, korpus 1, kv. 26, Moscow; Gennady A. Bezchastnov, Polessky proezd, 4, korpus 2, kv. 33, Moscow; Jury F. Telezhnikov, ulitsa Chusovskaya, 11, korpus 8, kv. 28, Moscow, all of U.S.S.R.

[21] Appl. No.: 414,326

[22] PCT Filed: Dec. 18, 1980

[86] PCT No.: PCT/SU80/00204

§ 371 Date: Aug. 10, 1982

§ 102(e) Date: Aug. 10, 1982

[87] PCT Pub. No.: WO82/02123

PCT Pub. Date: Jun. 24, 1982

[51] Int. Cl.³ .................... H02K 3/24; H02K 3/40; H01R 9/05

[52] U.S. Cl. ................. 174/15 C; 174/88 C

[58] Field of Search .................... 174/15 C, 88 C

[56] References Cited

U.S. PATENT DOCUMENTS 2,006,170  6/1935  Juhlin .................... 310/195

FOREIGN PATENT DOCUMENTS 1221503  6/1960  France .
268271  3/1927  United Kingdom .
1319257  6/1973  United Kingdom .
235167  11/1969  U.S.S.R. .

OTHER PUBLICATIONS

Publication "Direct Generation of Alternating Current at High Voltages", Hon. Sir Charles A. Parsons, *Journal I.E.E.*, vol. 67, No. 393, Sep. 1929.

*Primary Examiner*—John Gonzales
*Assistant Examiner*—Morris H. Nimmo
*Attorney, Agent, or Firm*—Fleit, Jacobson, Cohn & Price

[57] ABSTRACT

A coupling unit for two multilayer cables of a stator winding of a high-voltage generator, located in the end-face portion thereof, comprises terminations (1) of interconnected multilayer cables, wherein conducting layers (2,10) and conducting layer tubes (6,8) are concentrically arranged and separated from one another by insulating layers (7, 9, 14, 15), jumpers (18, 20, 22, 24) electrically coupling said conducting layers (2, 10) and conducting layer tubes (6, 8). A portion of each insulating layer (7, 9, 14, 15), facing the jumpers (18, 20, 22, 24) has a shape of an end insulation frustum (16). Each jumper (18, 20, 22, 24) is a totality of components made as a portion of a hollow cylinder limited by two planes. Each jumper (18, 20, 22, 24) carries an insulating bushing (12, 21, 23, 25). Thin-walled insulation cylinders (27, 28) are secured in each end insulation frustums (26) and in frustums (26) of the insulation bushings (19, 21, 23, 25). The surfaces of the frustum (26) of the insulating bushing (19, 21, 23, 25), the end insulation frustum (16), two adjacent jumpers (18, 20, 22, 24) and conducting layers (2, 10) coupled thereto and conducting layer tubes (6, 8) form an insulation chamber (30). The surface of the jumper (24), the tube (12) of the exterior conducting layer (10) connected to said jumper (24), the end insulation frustum (16), the frustum (26) of the insulating bushing (25), the thin-walled cylinders (27, 28) form an insulation cavity (31). The insulation chambers (30) communicate with one another and with the cooling ducts (5, 13) and with the insulation cavity (31).

1 Claim, 2 Drawing Figures

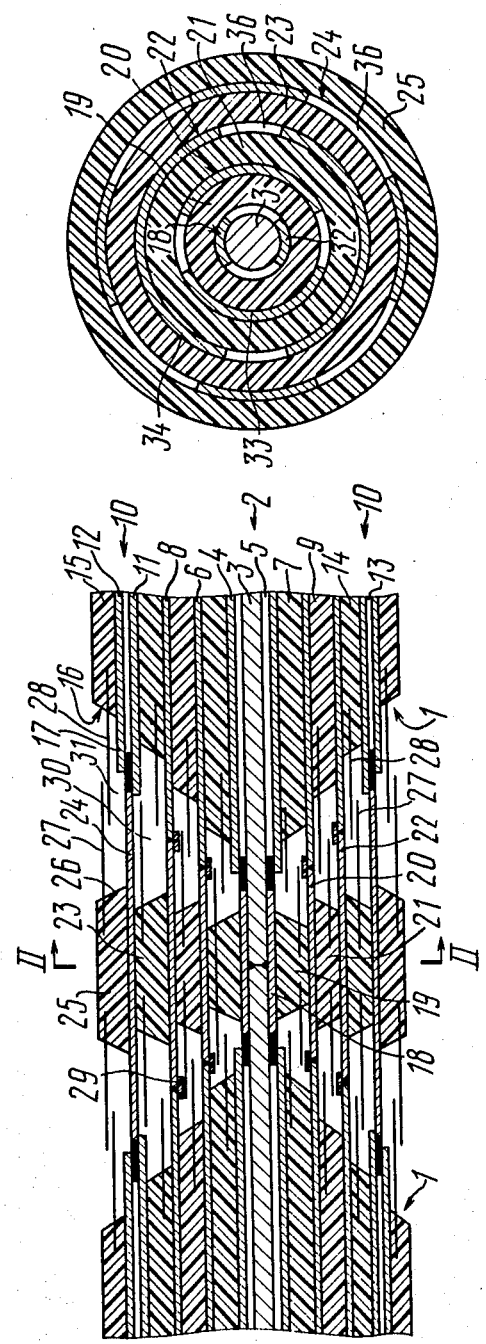

COUPLING UNIT OF TWO MULTILAYER CABLES OF HIGH-VOLTAGE GENERATOR STATOR WINDING

FIELD OF INVENTION

This invention relates to electromechanical engineering and, in particular, to a coupling unit for two multilayer cables of a stator winding of a high-voltage generator.

PRIOR ART

Modern electrical power engineering tends to use higher operating voltages of electrical machines and equipment, such as power transmission lines, transformers and generators in order to raise the efficiency thereof. However, higher working voltage complicates mating of electrical machines and equipment, for example, joining a high-voltage cable to a power transmission line or a transformer to a high-voltage cable. In particular, it becomes quite a problem to couple the face ends of high-voltage cables of a stator winding.

The prototype of the present invention is a coupling unit of two multilayer cables of a high-voltage generator stator winding (cf., The Proceedings of the Institute of Electrical Engineers, Vol. 67, No. 393, 1929, London, pp. 1065-1870, C. A. Parsons and J. Rosen, Direct Generation of Alternating Current of High Voltages).

The known coupling unit of two multilayer cables of a high-voltage generator stator winding, located in the end-face portion thereof, comprises terminations of the two cables, having concentric conducting layers made as tubes separated from one another by insulating layers. The coupling unit also has jumpers electrically joining conducting layers of the two multilayer cables, a portion of each insulating layer facing the jumpers having the shape of an end insulating frustum.

The jumpers are copper busbars placed on insulated supports in the end-face parts of the generator.

Terminations of cables in the known coupling unit are comparatively long, which is accounted for by the fact that wherever the insulation is interrupted, and this is exactly the zone of cable termination, the electric field is distributed in a highly irregular manner, which can lead to rupture of insulating layers. In order to remedy this fault and to do away with the danger all insulating layers in the terminating zone end in insulation frustums whose length depends on how low the electric field intensity is to be brought to match a specific level. Each insulation frustum thus becomes very long and would be still longer with the growth of the nominal voltage.

In this way the known coupling unit of two multilayer cables of a high-voltage generator stator winding becomes irritatingly bulky and generators rated for high stator voltages (110 kv, 220 kv and higher) are much more complex in manufacture.

The known coupling unit of two multilayer cables of a high-voltage generator stator winding is also deficient in that it does not permit direct cooling of the stator winding by feeding the cooling agent into the winding itself.

DISCLOSURE OF THE INVENTION

It is an object of the invention to provide a coupling unit of two multilayer cables of a high-voltage generator stator winding, wherein terminations of multilayer cables are connected so that to reduce the dimensions of the coupling unit and ensure direct cooling of said winding.

The invention resides in that in a coupling unit of two multilayer cables of a high-voltage generator stator winding, located in the end-face portion thereof, comprising terminations of the two cables, which have concentrically arranged conducting layers made as tubes separated by insulating layers, jumpers electrically connecting these conducting layers of the multilayer cables, the portion of each insulating layer facing the jumpers having the shape of an end insulation frustum, according to the invention, each jumper is a totality of components each made as a part of a hollow cylinder, limited by two planes, the components of the jumper connecting respective conducting layers of the terminations are arranged with respect to one another so that the jumper is a cylindrical surface having slots between said components, running parallel to the axis thereof, the components of the jumper connecting each subsequent layers are displaced with respect to jumper components connecting preceding conducting layers so that slots of the preceding jumper are located under the elements of the subsequent jumper, each jumper carrying an insulating bushing made in one piece of a cylinder and frustum so that the portions of said bushing are positioned symmetrically to the plane dividing the jumper into two equal parts and parallel to the butt ends thereof, thin-walled insulating cylinders being secured in said frustums and arranged concentrically with jumpers, said thin-walled insulating cylinders being secured in each end insulating frustum of the termination, the surfaces of the frustum of the insulating bushing and of the end insulating frustum, as well as the surface of two adjacent jumpers and conducting layers coupled thereto, between which said end insulating frustum is situated, form an insulation chamber wherein the thin-walled insulating cylinders are placed, a portion of each cylinder being inside another cylinder, whereas the surface of a jumper and the external conducting layer tube coupled thereto, the surface of the end insulating frustum and of the insulating bushing frustum, as well as the surfaces of thin-walled insulating cylinders of said frustums form an insulating cavity of each termination, the number of insulation chambers of each termination is less by one than the number of insulating layers and the insulation chambers of each termination communicate with one another and with the insulation cavity of said termination, as well as with cooling ducts formed by two adjacent concentric tubes electrically coupled to one another and forming one conducting layer.

The present invention permits direct cooling of multilayer cables of a high-voltage generator stator winding, as well as significant reduction of the coupling unit dimensions owing to the use of insulation chambers, which makes it feasible to provide a stator winding equipped with low-bulk coupling units located in the end-face portions of powerful high-voltage generators rated for stator voltages of up to 500 kv. The use of such high-voltage generators brings about substantial economy of electrical materials by giving up step-up transformers.

The invention will further be described with reference to a specific embodiment thereof, taken in conjunction with the accompanying drawings, wherein:

FIG. 1 shows a longitudinal section view of a coupling unit of two multilayer cables of a high-voltage generator stator winding, according to the invention;

FIG. 2 shows a longitudinal section view along line II—II of FIG. 1, according to the invention.

A coupling unit of two multilayer cables of a high-voltage generator stator winding, located in the endface portion thereof, comprises terminations 1 (FIG. 1) of multilayer cables to be coupled.

The termination 1 has a conducting layer 2 formed by a central cylindrical conductor 3 and a tube 4 enveloping said conductor 3, a cooling duct 5 being formed between the tube and conductor.

The central cylindrical conductor 3 can be made as a tube.

Next conducting layer is made as a tube 6 and is separated from the conducting layer 2 by an insulating layer 7.

The next conducting layer is made as a tube 8 and separated from the preceding conducting layer by an insulating layer 9.

A conducting layer 10 is made as two tubes 11 and 12 with a cooling duct 13 formed between the two tubes. The conducting layer 10 is separated from the conducting layer 8 by an insulating layer 14 and coated on the outside by an insulating layer 15.

The concentrically arranged insulating layers 7, 9, 14 and 15 and conducting layers 2 and 10, tubes 6 and 8 form the termination 1. Each insulating layer 7, 9, 14 and 15 ends with a surface forming an end insulating frustum 16. The central solid cylindrical conductor 3 and tubes 4, 6, 8, 11 and 22 are made so that each next tube 11, 8, 6 and 4 extends longer as compared to the preceding tube 12, 11, 8 and 6, respectively, starting from the outside tube 12 of the exterior conducting layer 10. Dimensions of the end insulating frustums 16 and protruding ends 17 of the tubes 4, 6, 8, 11 and 12 and of the central cylindrical conductor 3 depend on the parameters of the stator winding of a high-voltage generator (diameter of cables, number of conducting layers, nominal voltage, the amount of cooling agent, etc.).

Conducting layers 2 of the multi-layer cables to be coupled are electrically connected to one another by means of a jumper 18. An insulation bushing 19 is fitted on the jumper 18.

Tubes 6 of the following layers of the multi-layer cables to be coupled are electrically connected to one another by means of a jumper 20 carrying an insulation bushing 21.

Tubes 8 of the multi-layer cables to be coupled are electrically connected to one another by means of a jumper 22 whereon an insulation bushing 23 is placed.

Conducting layers 10 of multi-layer cables to be coupled are electrically connected to one another by a jumper 24 carrying a bushing 25.

Each jumper 18, 20, 22 and 24 carries respective bushings 19, 21, 23 and 25 so that the parts thereof are arranged symmetrically to the plane dividing a respective jumper 18, 20, 22 and 24 into two equal parts and parallel to the butt ends thereof.

The size of bushings 19, 21, 23 and 25 grow successively from the center of the coupling unit of two multilayer cables of a stator winding of a high-voltage generator towards the periphery.

The end insulating frustums 16 facing the jumpers 18, 20, 22 and 24 are displaced with respect to one another so that each next end insulating frustum 16 starting from the end insulating frustum 16 of the exterior insulating layer 15 extends towards respective jumpers 18, 20, 22 and 24 to a considerable length.

All bushings 19, 21, 23 and 25 are made as one-piece cylinder and frustums 26 wherein thin-walled insulating cylinders 27 are secured concentrically to the jumpers 18, 20, 22 and 24.

Similar thin-walled insulating cylinders 28 are secured in each end insulating frustum 16 of the terminations 1.

All jumpers 18, 20, 22 and 24 are electrically connected to respective conducting layer 2, tubes 6 and 8 and the conducting layer 10 of the both terminations 1 by soldering. Also soldered to one another are the cylindrical conductors 3.

Insulating rings 29 are secured inside the tubes 6 and 8 concentrically thereto in order to ensure greater rigidity of soldered connections and to raise the electric strength of these soldered connections inside the tubes 6 and 8.

The surface of the frustum 26 of the insulating bushing 19 and the surface of the end insulation frustum 16, as well as the cylindrical surface of the jumper 18 electrically coupled to the tube 4 of the conducting layer 2 and the cylindrical surface of the jumper 20 electrically coupled to the tube 6 form an insulation chamber 30. The insulation chamber 30 houses thin-walled insulation cylinders 27 and 28 arranged concentrically with the jumpers 18, 20, 22 and 24, a portion of one cylinder being placed inside the other with a clearance for the cooling agent.

The number of insulation chambers 30 of each termination 1 is less by one than the number of insulation layers 7, 9, 14 and 15.

Besides, the surface of the jumper 24 and of the tube 12 of the exterior conducting layer 10, connected thereto, the surface of the end insulation frustum 16 and of the frustum 26 of the insulating bushing 25, as well as the surfaces of the thin-walled insulation cylinders 27 and 28 form an insulation cavity 31 wherethrough the cooling agent (not shown) having insulation properties is fed into the ducts 5 and 13.

The insulation bushings 19, 21, 23, 25 should be preferably made by winding a laminated insulating material (tape) spliced at the end into frustums 26. The thin-walled insulation cylinders 27 can be easily fitted into the insulation bushings 19, 21, 23, 28 in the process of winding the tape.

The jumpers 18 (FIG. 2), 20, 22, 24 are made of elements 32, 33, 34 and 35, respectively. The number of elements 32, 33, 34 and 35 in the jumpers 18, 20, 22 and 24 depends on the dimensions of the multilayer cable. In this embodiment the jumpers 18, 20 and 22 are composed of two identical elements 32, 33 and 34, respectively, whereas the jumper 24 is made of four identical elements 35.

Each element 32, 33, 34 and 35 are portions of a hollow cylinder limited by two planes.

The elements 32 of the jumper 18 connecting the conducting layers 2 are arranged with respect to one another so that the jumper 18 has a cylindrical surface wherein slots 36 are provided between the elements 32 parallel to the axis thereof.

The elements 33, 34 and 35 in respective jumpers 20, 22 and 24 are arranged in the same manner.

The elements 32 of the jumper 18 are displaced with respect to the elements 33 of the jumper 20 whereby the slots 36 of the jumper 18 are located under the elements 33 of the jumper 20.

The elements 33, 34 and 35 of the jumpers 20, 22 and 24 are displaced with respect to one another in a similar manner.

Three insulation chambers 30 (FIG. 1) communicate with one another, with the insulation cavity 31 and with the cooling ducts 5 and 13 of one of the terminations 1, whereas the three other insulation chambers 30 separated from other chambers by insulating bushings 19, 21 and 23 communicate with one another, with the insulation cavity 31 and similar cooling ducts 5 and 13 of the other termination 1.

In this embodiment of a coupling unit of two multilayer cables of high-voltage generator stator windings the cooling agent is fed into the cooling duct 5 through the insulation cavity 31, the slots 36 in the jumper 24, subsequent insulation chambers 30 and the slots 36 of the jumpers 22, 20 and 18. The cooling agent in this case has insulating properties (cable oil, for example). The cooling agent is supplied to the cooling duct 13 through the insulation cavity 31 and the slots 36 in the jumper 24.

The design of this coupling unit of two multilayer cables of a high-voltage generator stator winding permits direct cooling of the stator winding of a high-voltage generator since the refrigerant is fed into the stator winding directly through the coupling unit of two multilayer cables.

In the proposed coupling unit of two multilayer cables of a high-voltage generator stator winding the insulation frustums 16 of the terminations 1 are not long owing to the use of thin-walled insulating cylinders 28 performing the function of insulation barriers excluding the possibility of flashover along the surface of the insulation frustums 16.

Similar protection against flashovers is provided for the insulation frustums 26 of the insulation bushings 19, 21, 23 and 25 by the thin-walled insulation cylinders 27.

The thin-walled insulation cylinders 27 and 28 are arranged in the insulation chamber 30 so that a portion of one cylinder is inside the other cylinder in order to exclude the possibility of disruption of the insulating medium (cooling agent) between the adjacent jumpers 18, 20, 22, 24.

The jumpers 18, 20, 22 and 24 are made of concentrically arranged elements 32, 33, 34 and 35 arranged so that the slots 36 of each preceding jumper 18, 20, 22 and 24 are located under the elements 33, 34 and 35 of the next jumper 20, 22 and 24, which permits to preserve the general configuration of the electrical field peculiar to the multilayer cable in the region between the terminations 1, in other words to preserve the concentric arrangement of the conducting layers 2 and 10, the tubes 6 and 8 separated by the insulating layers 7, 9, 14 and 15 in order to produce an almost uniform electrical field. It becomes possible to minimize the radial distance between two adjacent jumpers 18, 20, 22 and 24 and to improve operational conditions of insulation frustums 16 and 26 and, consequently, make them smaller.

The present embodiment of a coupling unit of two multilayer cables of a high-voltage generator stator winding is essentially a totality of space saving insulation chambers 30 communicating with one another and with the insulation cavity 31 and the cooling ducts 5 and 13. These insulation chambers are formed by the surfaces of the components of the coupling unit and the insulation thin-walled cylinders 27 and 28 which have a sufficient amount of electrical strength and serve to feed the refrigerant to the cooling ducts 5 and 13 of the multilayer cables of a stator winding.

In this way the proposed invention permits direct cooling of multilayer cables of a stator winding of a high-voltage generator and reduction of dimensions of the coupling unit of multilayer cables. It becomes possible to provide a stator winding featuring space-saving coupling units located in the endface portion of high-voltage generators. The use of the invention results in substantial saving of electrical materials owing to elimination of step-up transformers.

INDUSTRIAL APPLICABILITY

The invention can be used in production of high-power generators, turbogenerators for thermal and nuclear power plants, as well as for joining high-voltage cables.

We claim:

1. A coupling unit of two multilayer, high-voltage cables, said coupling unit comprising:

cable ends of two multilayer cables which have concentrically arranged conducting layers made as tubes separated by insulating layers, jumpers electrically connecting corresponding conducting layers of the multilayer cables, each insulating layer adjacent to the jumpers having an outer, axial face in the shape of a frustum, each said jumper defined by a plurality of individual elements forming a part of a hollow cylinder limited axially by two planes, each said jumper connecting respective conducting layers of the cable ends and arranged with respect to one another so that each jumper is a cylindrical surface having circumferentially spaced slots between adjacent elements and running parallel to the jumper axis, the elements of respective jumpers connecting each conducting layer tube being displaced circumferentially with respect to the jumpers connecting the innermost conducting layer so that the circumferentially spaced slots of the jumpers outwardly of said innermost conducting layer are located radially opposite the jumper elements of the adjacent jumper, each said jumper carrying an annular insulating bushing said bushings positioned symmetrically relative to the transverse plane dividing said jumper into two equal parts and extending axially relative to the cables, thin-walled insulating cylinders secured in said bushings and arranged concentrically with the jumpers, and similar thin-walled cylinders secured in and extending from each insulating layer of the cable ends, the opposite ends of the insulating bushings and the outer ends of the insulating layers, as well as the surfaces of two adjacent jumpers, the inner conducting layer, the conducting layer tubes, and the conducting layer coupled thereto, between which said insulating bushings are situated, form insulation chambers containing the thin-walled insulating cylinders, adjacent insulating cylinders having ends in overlapped relationship, whereas the surface of the outermost jumper and the tube of the external conducting layer coupled thereto at the surface of the cable end and the ends of the insulation bushings, as well as the surfaces of the thin-walled insulating cylinders, form an insulation cavity, the number of insulating cavities of each cable end being less by one than the number of insulating layers, and the insulation cavities of each cable end communicating with one another and cooling ducts in each cable formed by two adjacent, spaced concentric tubes electrically connected to one another and forming one conducting layer, corresponding cooling ducts of each cable communicating with each other.

* * * * *